Patented July 18, 1950

2,515,609

UNITED STATES PATENT OFFICE 2,515,609

METHOD OF REMOVING OXYGEN

Gordon F. Mills, San Francisco, Calif., assignor to Chemical Process Company, San Francisco, Calif., a corporation of Nevada No Drawing. Application September 22, 1947, Serial No. 775,558

2 Claims. (Cl. 210—24)

My invention relates to the removal of available oxygen from fluids, and more particularly to the removal of oxygen dissolved in liquids and also to the removal from or reduction of oxygen in oxidizing compounds, such as inorganic or organic peroxides, that may be dissolved in such liquids.

It is an object of my invention to provide an improved, simple, inexpensive and efficient method for such removal of available oxygen without the necessity of employing heat or mechanical means. Other objects of my invention will become apparent from a perusal of the following description.

In general, I have found that any of the well known nitrogen containing porous resin gels, preferably those resinous anion exchangers or acid adsorbents having available amine exchange groups, may be utilized as an effective medium for the removal of oxygen from fluids, when they are combined with copper in a valent state of less than two (2) i. e. either in substantially the free metal form or in the cuprous salt state; or with zero valent silver i. e. in substantially the free metal form. Organic resinous amine type exchangers of the character described may be represented by the following general formula:

wherein B stands for any of the usual resinous condensation reaction products which provide the framework to which amine groups are attached (hereinafter referred to as the resin "base"), and which are characteristic of the well known anion exchangers of the type described; N for nitrogen; and X for hydrogen or alkyl or substituted alkyl groups. This type of organic anion exchanger, which is referred to hereinafter as a resinous amine type anion exchanger, readily forms relatively stable complexes with copper and silver salts which are reduced in a manner hereinafter described to provide also relatively stable complexes of these metals in the valent state related for oxygen removal.

These reduced complexes readily react with oxygen dissolved in water or other liquids by mere contact with such liquids at ordinary temperatures, with consequent removal of the oxygen and corresponding oxidation of the metal to a higher valence. Also, such complexes are extremely effective in removing oxygen from, or reducing inorganic or organic oxidizing compounds, such as peroxides, that may be dissolved in water or other liquid, when they are brought into contact with such peroxide containing liquid. When the metal content of such adsorbent complexes is fully or largely oxidized, they may be regenerated, i. e. restored to their active oxygen removing or adsorbing state, by treatment with a suitable reducing agent. Exchangers of the type described are relatively stable and otherwise substantially inert to or insoluble in most common liquids adapted to be treated. Therefore, by use until substantial exhaustion followed by subsequent regeneration, they can be employed repeatedly over numerous cycles of operation.

In preparing an exchanger of the type described for oxygen removal use, a convenient method is to place the water wet exchanger resin in granular form in a column and run an aqueous solution of any suitable alkali therethrough, such as sodium hydroxide or ammonium hydroxide, to wash the exchanger substantially free of any acid if present. Such acid removal is desired because I have found that material presence of acid interferes with adsorption of the desired metal ion by the resin which forms the described complexes. Next the exchanger is then washed with water to remove excess alkali.

An aqueous solution of any suitable water soluble copper or silver salt, such as cupric or cuprous sulfate, chloride, or nitrate, or silver nitrate, sulfate or acetate is then run through the exchanger until the respective metal ions begin to appear strongly in the effluent. When this occurs, the exchanger has adsorbed substantially its full capacity of the metal ion, and the exchanger is then washed with water until free of excess metal ion. The exchanger will now contain the cupric, cuprous or silver ion, whichever the case may be, bound in a relatively stable complex from which the metal ion does not readily ionize.

If desired, the metal ion impregnated exchanger resin may be prepared by stirring the exchanger, in the form of relatively small granules, with the aqueous salt solution of the desired metal, and then washing out the excess metal salt. The first described method of impregnation is preferred, however.

To reduce the cupric or monovalent silver ion in the exchanger complex to oxidizing form, such complex may be treated at room temperature, in a column or by stirring in a slurry, with an aqueous solution of any suitable reducing agent that is water soluble and will not adversely affect the resinous exchanger complex. Reducing agents which I have found most satisfactory and which result in products having relatively high capacity, are water soluble alkali metal hydrosulfites, such as sodium hydrosulfite, or water soluble alkali metal hydrosulfite derivatives such as sodium formaldehyde sulfoxylate. Sodium hydrosulfite is preferred because of its ready availability. Although not necessary, it is preferable that the solution of the reducing agent be strongly alkaline as this will often render the reducing reaction more efficient, and also markedly improve ease of removal of excess reducing agent from the reduced resin.

When the exchanger complex is subjected to or treated with an aqueous solution of the hydrosulfite, or hydrosulfite derivative reducing agent, at room temperature, the exchanger adsorbed copper or silver ion is reduced substantially quantitatively, and is left in a form where it is most active in the oxygen adsorbing or removing step.

I believe the reduction effect on the copper is to the extent of substantially all zero valence, although some monovalent copper may be present, while the silver is reduced substantially entirely to the zero valent form. In this connection, instead of impregnating the exchanger with cupric salts, the lower valent water soluble cuprous salts may be used as previously indicated, but the cupric salts are preferred because this is more convenient. In any event, the treatment with the reducing agent reduces the copper to its oxygen adsorbing form.

Mere treatment of the resinous amine type exchanger with an aqueous solution of any suitable water soluble cuprous salt, such as those previously mentioned, will produce an oxygen removing exchanger complex, without the necessity of employment of the reducing step, in which the copper will be in monovalent form. However, the reduction step is preferred even when cuprous salts are caused to react with the exchanger because this provides for increased capacity. The oxygen removing exchanger complex will have the following general formula:

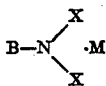

wherein B, N and X have the same representation as in the preceding general formula of the resinous amine type exchanger itself; M represents copper with a valence of less than two or silver with zero valence; and the (.) represents the complex association of the metal with the resin.

Regardless of the means used to provide the oxygen removing exchanger complex, such exchanger will effect removal of dissolved oxygen from all common liquids, to the point below the sensitivity of existing methods of testing for oxygen dissolved in such liquids, namely, below one-tenth (0.1 P. P. M.) part per million. Removal of dissolved oxygen is of extreme importance, from feed water employed for high pressure boilers. My invention has found important applicability for this purpose, as the removal of the dissolved oxygen has entirely obviated corrosion problems which have been otherwise caused thereby. It is only necessary to bring the boiler feed water or other liquid from which the oxygen is to be removed into contact with the oxygen removing resin, either by mixing the liquid with the resin, but preferably by passing the liquid through a granular bed of the resin, at ordinary temperatures, until the resin is exhausted, as will be indicated by the presence of oxygen in the treated liquid.

Such treatment will result in formation of a composition in which the exchanger complex has adsorbed the oxygen and which is substantially inert to or insoluble in the liquid from which the oxygen is removed. Consequently upon separation of or removal between the liquid and the exchanger in its oxygen adsorbent state, the exchanger can be restored to its original state by regeneration with the type of reducing agent described.

Not only can the oxygen removing exchanger complex of my invention be employed for removal of dissolved oxygen in liquids, but it can be also used for removal of oxygen from inorganic or organic peroxides dissolved in various aqueous or non-aqueous liquids, including hydrogen peroxide in water, by reduction of the peroxides or adsorption thereof. This is of value in the production of various types of resin plastics, wherein it is quite common to employ peroxides in initiating various polymerization reactions, and it is desirable to remove or reduce the peroxides in a simple manner at some later stage of the polymerization process, as unwanted presence of peroxides constitutes a safety hazard.

These peroxides frequently develop spontaneously in polymerizable compounds in storage; and their removal is not only desirable for safety reasons but also for control purposes, so that one may determine the correct quantity of peroxide to be added when polymerization is to be subsequently effected. For peroxide removal or adsorption, the same technic may be employed as for the removal of dissolved oxygen from liquids.

For best results, the liquid to be treated with my oxygen removing exchanger complex should be neutral or alkaline because markedly acid solutions result in marked leaching of the metal from the complex into the liquid or effluent, and the adsorption capacity of the exchanger becomes impaired. However, my oxygen removing exchanger is effective in an acid solution but the acidity of such solution should not be much below a pH of one and one-half (1.5).

In use of my oxygen removing exchanger, slight leaching of copper or silver therefrom, whichever the case may be, into the liquid or effluent, usually occurs both during the oxygen removal step and also during regeneration with the reducing agent. The loss of metal during the latter step is immaterial except insofar as it effects loss of capacity of the exchanger for removal of oxygen on successive cycles. This loss can be restored by retreatment of the exchanger with the metal salt solution in the manner previously related.

Loss of metal into the liquid being treated for removal of oxygen, although extremely slight as it is in the order of one (1) to ten (10) parts per million (1,000,000) parts of liquid being treated, may not be tolerated under some circumstances because of resultant contamination of the liquid being treated. In such cases, the metal leached out in the course of oxygen removal from the treated liquid may be eliminated therefrom after removal of the oxygen, by any suitable chemical treatment of precipitation, or adsorption of the leached out metal. I preferably employ ion exchange for such removal of metal from the liquid after removal of oxygen therefrom and separation from the oxygen removing exchanger complex, preferably by passing the liquid from the oxygen removal step, through a granular bed of any suitable organic cation exchanger resin operable on either the hydrogen or sodium cycle. Upon exhaustion, the organic cation exchanger can be regenerated by any suitable method well known in the art.

The particular choice between either hydrogen or sodium cycle cation exchanger for removal of copper or silver ions leached out by the liquid, is dependent largely on the character and end use of the liquid being treated for removal of the oxygen. If sodium ions are unobjectionable in the liquid, then a sodium cycle exchanger can be used. However, if the liquid has to be demineralized, then a hydrogen cycle exchanger should be employed. In any event, the treatment with cation exchanger, and subsequent separation between the exchanger and liquid, will reduce the leached metal content in the liquid from the oxygen removal step, below the point where it can be detected by even the most sensitive chemical test.

An alternative treatment for removing metal leached out by the liquid or effluent from the oxygen removal step, is to bring the liquid into contact with any suitable amine type anion exchanger or acid absorbing resin of the character related, which is useful for the preparation of the oxygen removing resin itself, preferably by passing the liquid through a granular bed of the exchanger. Such exchanger will serve to adsorb completely the metal ion up to a point where its capacity for complete adsorption is exceeded, and can be regenerated at such time by successive treatment with an excess of any suitable acid such as hydrochloric or sulphuric, followed by treatment with any suitable alkaline solution such as sodium or ammonium hydroxide. The employment of the anion exchanger resin itself for the removal of the metal is particularly recommended in the case of a fluid such as gasoline and other hydrocarbons where suppression of ionization makes the ordinary cation exchange process operable with difficulty.

The following examples are illustrative of my invention:

Example I

One hundred cc. of a well known commercial phenolformaldehyde anion exchanger resin in granular form, which was aminated with a polyethylene amine, was placed in a column. It was washed lightly with an aqueous solution of sodium hydroxide until the effluent was basic to phenolphthalein indicator, and then with demineralized water (equivalent to distilled water) until neutral to the same indicator. Copper sulfate ($CuSO_4$) solution (0.1 normal) in water, was then passed downflow through the column, and the effluent collected.

Test showed that the exchanger had adsorbed about 0.05 equivalents of cupric ion from the treating solution. The resin was further washed with demineralized water until the effluent was substantially free of cupric ion, and the resin was then treated with 9.2 grams of sodium hydrosulfite ($Na_2S_2O_4$) and 4.0 grams of sodium hydroxide (NaOH) dissolved in 100 cc. of water, which solution was poured into the column of the resin. This reducing agent solution was washed through the resin with excess water at a 10 volume per hour rate. The passage of the hydrosulfite through the resin could be followed by the color change in the resin. The resin when impregnated with cupric salt was blue green in color, and this was changed to a dark purple or almost black by contact with the hydrosulfite. Washing of the resin with water was continued until the effluent was free of excess alkali, sulfate, sulfite, and hydrosulfite ions. The resultant oxygen removing exchanger complex was then ready for use.

Water containing 8.0 parts per million of dissolved oxygen was passed through this complex at a 50 volume per hour rate at room temperature. The oxygen was completely removed from 70 liters of such water. Calculation showed that this figure corresponds with an oxygen adsorbing capacity of 5.4 grams per liter of the wet adsorbent.

Example II

A resin gel prepared by causing 0.66 moles urea, 0.33 moles of phenol, and 2.5 moles of 40% technical formaldehyde to react by heating at 95° C. under alkaline condition was granulated and 100 cc. of the water wet resin placed in a column. After washing of the resin as in Example I, an aqueous cupric chloride solution was passed through the column and the resin adsorbed 0.004 equivalent of cupric ion. When reduced with an aqueous sodium hydrosulfite solution in the manner related with respect to Example I, the impregnated resin functioned as an oxygen adsorbent although much inferior in capacity as compared to the exchanger complex of Example I.

Example III

One hundred cc. of an anion exchanger resin in granular state, similar to that of Example I, was impregnated with an aqueous silver nitrate solution ($AgNO_3$) rather than with copper sulfate solution. The water washed silver ion impregnated resin was reduced with 5.0 grams of sodium hydrosulfite ($Na_2S_2O_4$) dissolved in 100 cc. water in a manner analogous to that described in Example I. The reduced resin was dark brown to black in color. Such reduced resin, after being washed with water until free of sulfate, sulfite, and hydrosulfite ions, completely removed dissolved oxygen from 15 liters of water containing 8.0 parts per million oxygen.

Example IV

A sample of an anion exchanger resin (100 cc.) similar to that of Example I, and impregnated with copper in the manner of Example I, was reduced with 100 cc. of water containing 10.0 grams of sodium hydrosulfite ($Na_2S_2O_4$), 4.5 cc. of formaldehyde (HCHO) (40% solution), and 2.3 grams of sodium hydroxide (NaOH). The resulting solution is the equivalent of about 7.0 grams of sodium formaldehyde sulfoxylate dissolved in the same amount of water. The reduced resin, after washing with water in the manner described in Example I, was tested against water containing 7.0 parts per million of dissolved oxygen, at a flow rate of 30 volumes per hour. It removed a total of 0.51 gram of oxygen before breakthrough occurred.

In the foregoing examples, the oxygen removing exchanger complex was tested against tap water containing oxygen dissolved therein, and in every case succeeded in substantially completely removing the oxygen from the water. I have tested the ability of my oxygen removing exchanger complex to withstand repeated cycles of oxygen adsorption followed by regeneration. It was found, in some cases, that after about fifty (50) such cycles, the oxygen adsorbing capacity was reduced substantially. This is at least partly due to the fact that the metal impregnant is slowly leached from the exchanger complex or otherwise rendered inactive.

This may, in most cases, be remedied by reimpregnating the resin with additional metal salt solution so as to bring its metal content back to its original value, and then reducing the fresh impregnant as described. Over more extended periods of use, it may be desirable to remove all metal from the resin, e. g. by treating with an aqueous solution of a water soluble cyanide in the presence of oxygen, before reimpregnating with fresh metal solution. In some cases, depending upon the character of liquid being treated, a permanent decrease in adsorption capacity following extended cycling may occur, probably as a result of the deterioration of the exchanger under the conditions of use, and under such circumstances, fresh exchanger should be employed instead of regenerated exchanger.

Example V

One hundred (100) cc. of another well known anion exchanger resin in granular form, made by reacting acetone, formaldehyde and tetraethylene pentamine in acid solution were placed in a column and treated as in Example I. It adsorbed about 0.035 equivalent of cupric ion. On reduction with sodium hydrosulfite solution, the material used as an oxygen removing resin adsorbed about 2.5 grams of oxygen from water per liter of wet adsorbent before oxygen began to appear in the treated water.

Example VI

Two 100 cc. samples of a granular anion exchanger resin similar to that of Example I, were each impregnated with 3.9 grams of cuprous chloride ($Cu_2Cl_2$) dissolved in a saturated aqueous sodium chloride (NaCl) solution, by shaking the resin and solution together for two hours. The impregnated samples were washed with water to free them of excess salts. One sample was tested directly (without reduction of the cuprous chloride) for oxygen adsorption against water at a 30 volume per hour rate. It completely removed the dissolved oxygen from 24 liters of water which indicated a capacity of about 2.7 grams of oxygen per liter of wet adsorbent.

The other sample was tested, without reduction of the cuprous chloride, for removal of dissolved oxygen from a hydrocarbon solvent. To displace the water from the exchanger, it was first washed with three volumes of the water miscible solvent, acetone, and the acetone was in turn displaced by the hydrocarbon solvent. A Stoddard type hydrocarbon solvent was used. Test of dissolved oxygen removal from this solvent indicated that about 1.3 grams of oxygen were removed per liter of wet adsorbent before the first traces of oxygen appeared in the effluent.

Similar results are obtainable when the reduced resin is prepared in the preferred manner of impregnating with cupric or silver salts and reducing in situ.

Example VII

A sample of granular anion exchanger resin (125 cc.) similar to that of Example I, was prepared. The water was removed from the exchanger and replaced with a Stoddard type hydrocarbon solvent as described for test 2 in Example VI. A solution of benzoyl peroxide in such Stoddard type hydrocarbon solvent was prepared, and analyzed about $3.5 \times 10^{-3}$ moles per liter benzoyl peroxide. It also contained dissolved oxygen to the amount of 57.0 parts per million, and was passed through a bed of the adsorbent contained in a one inch diameter column at a flow rate of 10 volumes per hour.

The adsorbent removed both oxygen and peroxide; and breakthrough (when oxygen appeared in the effluent in excess of 0.1 part per million) of both dissolved substances occurred at about the same time. The breakthrough capacity of the adsorbent was about 0.1 mole per liter taking the peroxide and oxygen together.

The adsorption capacity of the above oxygen removing exchanger complex was increased by a factor of two to three by employing a solution composed of 10% acetone and 90% hydrocarbon solvent, in place of the pure hydrocarbon solvent. In general, the presence of polar liquids improves the rate of reaction of the exchanger complex, with peroxides as well as with oxygen.

In the example, benzoyl peroxide was the organic peroxide removed by the described adsorbent. This peroxide is particularly interesting, as it is one commonly employed in polymerization of many unsaturated organic substances. It has been found that the rate of reaction of the adsorbent with peroxides is dependent on the peroxide used. Thus, I find that acetyl peroxide will react much more rapidly with the adsorbent than will benzoyl peroxide. On the other hand, lauryl peroxide is more difficult to remove by this method although such removal can be accomplished.

Hydrogen peroxide can also be removed from aqueous and non-aqueous solutions by the described method, although in some cases this appears to be partly adsorption and partly catalytic decomposition. Thus, a reduced silver exchanger complex prepared according to Example III, caused much evolution of gas when an aqueous hydrogen peroxide solution was passed through it. The silver resin was less active, however, for the removal of organic peroxides, and was found to be inefficient for practical purposes for the removal of the least active peroxides such as lauryl peroxide.

When the described oxygen removing exchanger complex has been used for removal of oxygen or peroxides from non-aqueous liquids and is exhausted, it may be regenerated in the manner previously described. However, inasmuch as the regeneration must be carried out in an aqueous medium, the non-aqueous liquid must be first displaced from the exchanger by an aqueous medium, so that the exchanger, before being treated with a suitable reducing agent, is bathed in a substantially aqueous fluid. Such displacement can be readily effected in a manner reverse to that described in Example IV. The reducing agent, preferably sodium hydrosulfite solution, is then added and the excess washed out with water. The water is in turn displaced with the desired non-aqueous liquid to return the adsorbent to a condition suitable to the treatment of the liquid involved, as described in Example VI.

I claim:

1. The method of removing available oxygen from a liquid containing such oxygen which comprises providing a granular bed of a complex of an acid absorbing anion active resin and a reducing agent selected from the group consisting of copper having a valence of less than two and zero valent silver, whereby a substantially insoluble composition is formed in said liquid by said available oxygen with said complex; when said complex has lost capacity to remove said oxygen, restoring such capacity by regeneration with an aqueous solution of a reducing agent selected from the group consisting of an alkali metal hydrosulfite and an alkali metal formaldehyde sulfoxylate; and again utilizing the regenerated complex for further oxygen removal from said liquid.

2. The method of removing available oxygen from a peroxide dissolved in a liquid which comprises providing a granular bed of a complex of an acid absorbing anion active resin and a reducing agent selected from the group consisting of copper having a valence of less than two and zero valent silver, whereby a substantially insoluble composition is formed in said liquid by said available oxygen with said complex; when said complex has lost capacity to remove said oxygen, restoring such capacity by regeneration with an aqueous solution of a reducing agent selected from the group consisting of an alkali metal hydrosulfite and an alkali metal formaldehyde sulfoxylate; and again utilizing the regenerated complex for further oxygen removal from said peroxide in said liquid.

GORDON F. MILLS.

REFERENCES CITED

The following references are of record in the file of this patent:

UNITED STATES PATENTS

| Number | Name | Date |
|---|---|---|
| 2,066,271 | Irwin | Dec. 29, 1936 |
| 2,151,883 | Adams et al. | Mar. 28, 1939 |
| 2,198,378 | Ellis | Apr. 23, 1940 |
| 2,217,850 | Warne et al. | Oct. 15, 1940 |
| 2,251,234 | Swain | July 29, 1941 |
| 2,354,172 | Myers et al. | July 18, 1944 |
| 2,434,190 | Barnes et al. | Jan. 6, 1948 |